United States Patent [19]
Swensen

[11] 3,960,007
[45] June 1, 1976

[54] ULTRASONIC STANDING WAVE SENSOR

[76] Inventor: Eugene T. Swensen, 2400 W. 102nd St., Apt. 313, Minneapolis, Minn. 55431

[22] Filed: Sept. 27, 1974

[21] Appl. No.: 510,078

[52] U.S. Cl. .............................. 73/67.8 R; 340/16 R
[51] Int. Cl.² .......................................... G06M 7/04
[58] Field of Search .......... 73/67.8 R, 67.2, DIG. 4; 340/16 R, 38 S

[56] References Cited
UNITED STATES PATENTS

| | | |
|---|---|---|
| 2,903,886 | 9/1959 | Renaut ............................ 73/67.8 X |
| 3,014,364 | 12/1961 | Crooks ............................ 73/67.8 X |
| 3,042,899 | 7/1962 | Kendall et al. ..................... 340/38 S |
| 3,056,284 | 10/1962 | Marsh et al. ........................ 73/67.8 |
| 3,505,866 | 4/1970 | Weisbord et al. .......... 73/517 AV X |

*Primary Examiner*—James J. Gill
*Attorney, Agent, or Firm*—Harold D. Jastram

[57] ABSTRACT

This invention relates to an ultrasonic sensor utilizing simultaneous transmission and receipt of ultrasonic energy in a standing wave pattern to detect a target moving in front of a transducer and providing count, range, rate and direction information.

3 Claims, 7 Drawing Figures

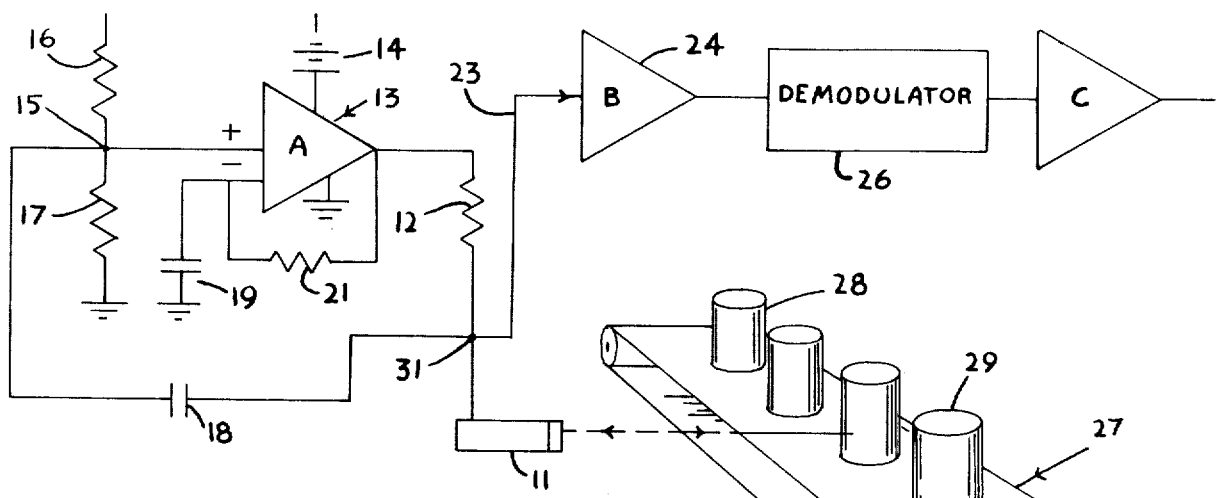
FIG. 4
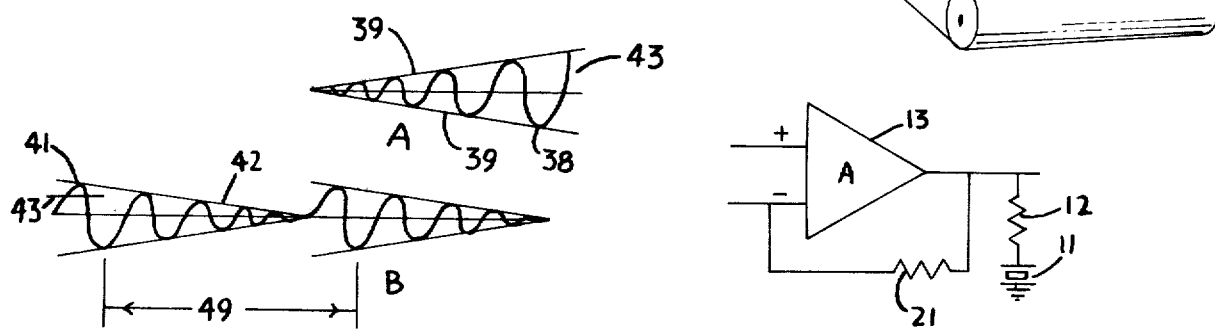
FIG. 5
FIG. 7
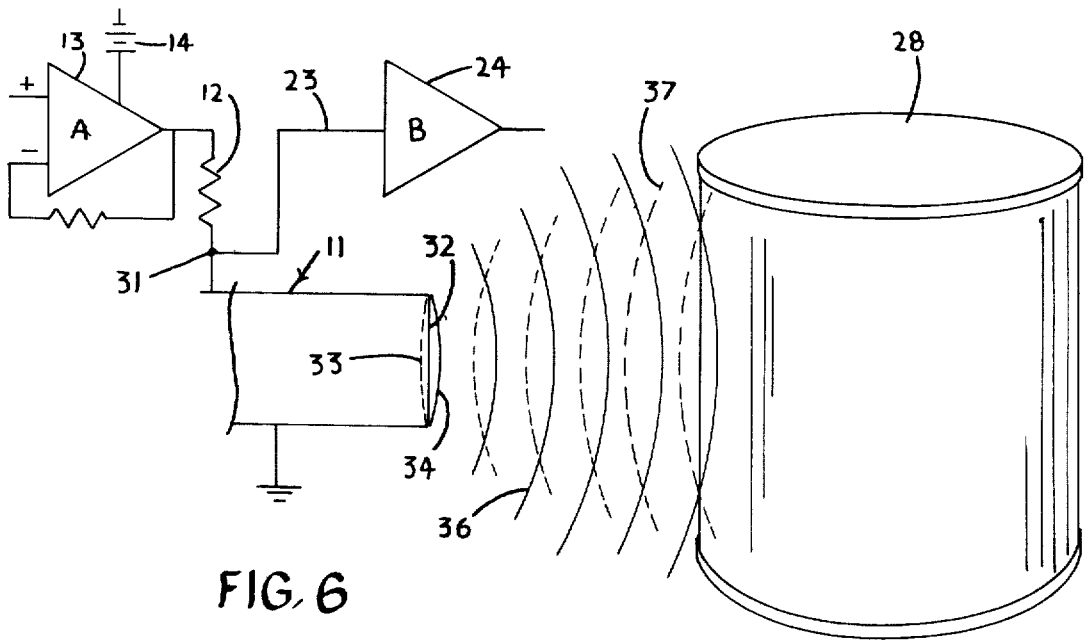
FIG. 6

ULTRASONIC STANDING WAVE SENSOR

BACKGROUND OF THE INVENTION

Ultrasonic inspection systems for detecting various characteristics of articles moving before transducers are well-known in the art. These systems have been utilized for a number of applications. For instance, the systems can be utilized to detect the number of targets moving past transducers. Further, such ultrasonic detection systems have been utilized to detect the rate of movement of targets moving within a range of such ultrasonic detectors.

An example of an ultrasonic inspection system utilizing known techniques is illustrated by U.S. Pat. No. 3,321,959 which utilizes the Doppler shift for inspection purposes. A system of the Doppler type typically utilizes a transmitter and a receiver which are separate and discrete elements.

Another sonic system is illustrated in U.S. Pat. No. 3,424,507. This system also illustrates the prior art need to utilize both a transmitter and a separate receiver for locating objects. This utilization of separate transmitting transducers and receiving transducers is typical of the prior art and the inability of prior art systems to effectuate detection without the use of separate and discrete transducers as receivers and transmitters. A further example of this prior art is illustrated in U.S. Pat. No. 3,504,532 which illustrates a nondestructive testing system. Again, the system uses distinct and separate transmitting and receiving transducers.

These prior art systems have "built-in" disadvantages. First, the transmitting transducer and the receiving transducer are separate elements. There is an inherent need in such a system for tuning of these devices. For example, in the event of frequency drift of the transmitting transducer, there must be a corresponding adjustment made in the receiving transducer in order to insure accurate detection by the system.

Naturally, there can be no frequency tracking in such a system which is accurate. In other words, any drift in the frequency on the part of the transmitting transducer is of necessity followed at a discrete point in time later by an appropriate adjustment in the frequency response of the receiving transducer. This time lag, of course, results in inaccuracies, limitations, failure and other inaccuracies in such a system.

SUMMARY OF THE INVENTION

It is an object of this invention to provide a system for sensing a target, to provide count, range, rate and direction information concerning the target.

Further, the invention provides an ultrasonic standing-wave sensor which requires no tuning, trimming or adjustment in order to provide count, range, rate and direction information concerning a moving target moving within the range of the transducer which operates simultaneously as a transmitter and receiver of ultrasonic energy.

The use of a single transducer as a transmitter and receiver without the need for pulsing the transducer, as in the prior art systems, provides a sensor which offers other advantages. For instance, the entire sensor system is not sensitive to frequency drift of the piezo-electric device which might be used as a transducer. As noted above, the typical sensor system must be tuned, adjusted and trimmed in order to constantly compensate for frequency drift in the transmitter. Since the transmitter and receiver are the same element in this invention, there is a constant frequency tracking "built into the system" which requires no such adjustment.

Further advantages of this system are achieved through the location of the amplifier-oscillator in the powder side of the circuit rather than on the signal side of the circuit as in conventional systems. This particular configuration maximum maximumm acoustical output over time and temperature changes by assuring drive frequency tracking of the active element at its natural frequency. It is apparent that the frequency drift is inconsequential since the transducer acts as the receiver and transmitter and thereby eliminates the need for any such frequency tracking adjustment.

The system operates by detecting the standing-wave impact reflected back from the target. This standing-wave impact strikes the transducer and results in an impedance mismatch which is reflected back to the drive circuitry (the amplifier-oscillator) and manifests itself as a voltage change. This voltage change is detected by conventional comparators, computators and the like, in order to give an indication of target count, rate, range and direction.

A reference to the drawings and a detailed description of the invention will provide a more specific detailed understanding of the various features of the invention.

THE DRAWINGS

Figure 1:
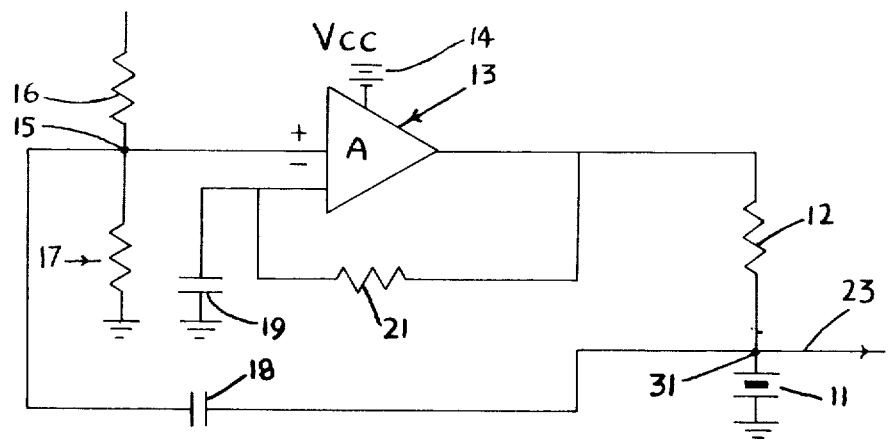
FIG. 1 illustrates an ultrasonic standing-wave sensor system used in an ultrasonic device in accordance with the present invention.
Figure 3:
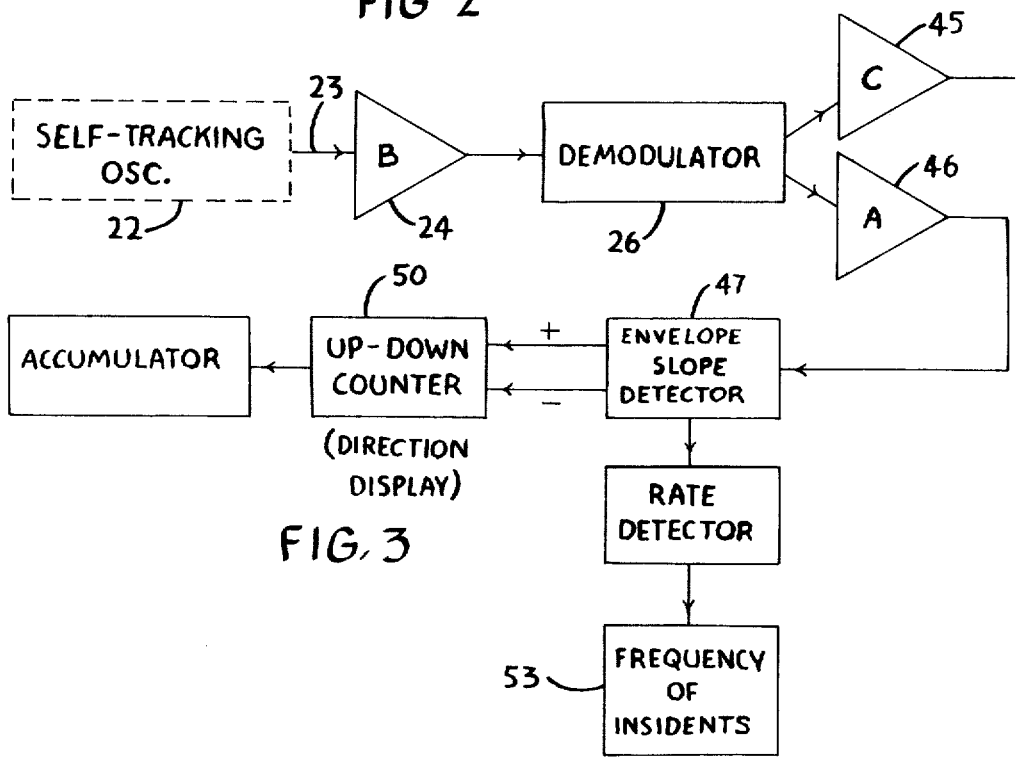

FIG. 3 of the drawings is a block diagram of an entire system employing a self-tracking oscillator in an ultrasonic detection system;

FIG. 4 of the drawings illustrates a detailed circuit in accordance with FIG. 1 of the drawings using a buffer amplifier and illustrating targets moving on a conveyor system;

FIG. 5 illustrates a wave pattern generated by the system illustrated in FIG. 1 of the drawings;

FIG. 6 illustrates the ultrasonic wave pattern generated by the system illustrated in FIG. 1 of the drawings; and FIG. 7 illustrates an alternate embodiment of the system illustrated in FIG. 1 of the drawings in which a split supply is used.

DETAILED DESCRIPTION OF THE INVENTION

Refer first to FIG. 1 of the drawings which illustrates a detailed circuit in accordance with the invention. Transducer 11 is preferably a piezo-electric transducer which is used both as a transmitter transducer and as a receiver transducer. This transducer 11 is driven by an amplifier/oscillator 13 which is interconnected with the transducer 11 by a resistor or resistive impedance 12.

A voltage drop is provided across resistor 12 which is approximately equal to the anti-resonant impedance of the transducer 11. Resistor 12 provides a mismatch in impedance to provide the simultaneous transmitter-receiver function of the system.

Amplifier 13 is energized by a D.C. voltage source 14. The amplifier 13 becomes an oscillator for driving the transducer 11 at its natural frequency. It is noted at this point that this amplifier-oscillator 13 is in the power side of the circuit as noted hereinbefore.

Resistors 16 and 17 provide a voltage drop between the power source and ground. Resistors 16 and 17 (resistive impedances) provide a combination which establish a bias for amplifier 13 at one half the total voltage drop across the two resistors 16 and 17 and the ground. This bias voltage is one half (½) the voltage level of voltage source 14.

Capacitor 18 is connected to amplifier 13 at the impedance midpoint 15 between resistors 16 and 17. It is connected to transducer 11 and determines the approximate free-running oscillation range of the system, the transducer 11 itself providing the exact oscillation range. This capacitive impedance establishes a phase lag of greater than 90° between the transducer 11 and input to amplifier 13.

Capacitor 19 interconnects the amplifier 13 to ground and provides an A.C. return to ground. The capacitive impedance provided by capacitor 19 also determines the amplifier gain. The capacitive impedance would not be used with a split supply. In such a case, resistors 16 and 17 would not be necessary. Such a system utilizing a split supply is illustrated in FIG. 7 of the drawings.

Resistor 21 is utilized to provide D.C. feedback and to saturate the amplifier. Therefore, resistor 21 should provide sufficient resistive impedance to determine a reasonable amplifier saturation level for the system.

The circuitry utilizing the operational amplifier could consist of discrete components rather than integrated circuitry. In either case FIG. 1 illustrates the basic configuration for many applications of the invention. The system which employs a single transducer as both the transmitter and receiver in an ultrasonic standing-wave sensor system uses this basic system.

Refer now to FIG. 3 of the drawings which illustrates a block diagram employing the detailed circuitry of FIG. 1. The dotted box 22 illustrates the self-tracking oscillator system described in connection with FIG. 1. The output 23 from the self-tracking oscillator 22 tends to have a very high impedance and, accordingly, a buffer amplifier 24 is employed in connection with this illustration of the invention to reduce the impedance for further utilization of the signal. The signal or signals which are illustrated by signals A and B of FIG. 5 of the drawings are fed from buffer amplifier 24 into a demodulator 26. Demodulator 26 is a conventional system using known components.

Reference to FIG. 4 of the drawings will demonstrate the generation and utilization of signals A and B illustrated in FIG. 5 of the drawings. Assume that the conveyor 27 is a typical conveyor belt in a factory producing canned goods and moving the cans 28 along the conveyor 27 in the arrow direction. A manufacturer of such a product has the problem of counting the total number of cans manufactured, identifying their rate of movement along the conveyor and also determining the absolute number of cans passing a given point with compensation for any slow-down or reversal of the cans in direction along the conveyor belt.

To solve these problems, a transducer 11, according to the present invention which is a combination transmitter and receiver, is positioned at a point within a short distance of the cans 28. As a can 29 moves by the acoustical transducer 11, in the arrow direction, sound waves generated by the transducer 11 strike the can and produce a standing wave which is picked up also by transducer 11. This reflected wave impinges on the transducer 11 and alters the mechanical impedance of the transducer 11. Since the mechanical impedance of the transducer 11 is altered, electrical output of the oscillator 13 will be affected with the result that greater or lessor energy, electrical energy, will be necessary to drive the transducer 11. This variation in the electrical energy necessary to oscillate or drive the transducer 11 as a transmitter, results in a variation in the voltage level at point 31 in the circuitry.

A very simplistic example illustrating this principle is set forth in FIG. 6 of the drawings, in which transducer 11 might be considered to be a piston. Oscillator 13 drives the surface 32 of the piston back and forth as illustrated by dotted lines 33 and 34. This oscillation of the surface 32 of the transducer (piston) 11 generates sound waves illustrated by solid lines 36 which are directed toward the target 28 (again illustrated as a can). This acoustical wave 36 strikes the target 28 and is reflected as illustrated by the dotted lines 37. These dotted lines are reflected back to the surface 32 of the transducer 11 and are either in phase with the movement of surface 32 or are in opposition to the movement of surface 32. If the reflected waves or standing waves 37 are in phase with the surface, then of course, less energy will be required to drive the surface 32. This phenomenon will be electrically detected at point 31 because less energy will be required to drive transducer 11 and therefore less energy is necessary to drive the surface 32. The resultant lower voltage requirement appears at point 31 and results in an electrical signal change which is fed into buffer amplifier 24.

On the other hand, if standing wave 37 is out of phase with the surface 32 and the standing wave 37 strikes the surface 32, then, of course, greater energy (a higher voltage) will be required to drive the surface 32. This higher voltage will be likewise detected will point 31 in the circuitry and again willl result in an electrical signal which is fed into the buffer amplifier 24.

Consider now the situation where can 28 is moving on a conveyor belt in the arrow direction as illustrated in FIG. 4. The arrow direction is illustrated by the wave pattern A illustrated in FIG. 5 of the drawings. The wave begins to build up in a sine wave pattern and reaches a peak at point 38. This wave pattern electrically describes several characteristics. First of all, it forms an envelope 39 having a slope which can be called an upslope. This envelope is illustrated by lines 39 in the drawing. This particular wave pattern can be utilized by additional circuitry to illustrate or detect several bits of information concerning the target. These will be pointed out hereinafter.

In the event that the conveyor 27 illustrated in FIG. 4 should move opposite the arrow direction, or in the event the cans 29 should move opposite the arrow direction for any period of time, the transducer 11 will still detect such movement. Refer again to FIG. 4 of the drawings for a continued illustration of the principles of the invention. As can 29 continues to move forward in the arrow direction on conveyor 27, an electrical signal which is typical of the signal A set forth in FIG. 5 of the drawings, is generated and is present at point 31 in the circuitry. This signal is fed into buffer ammplifier 24. The output of buffer amplifier 24 is fed into a demodulator 26 which is designed to detect a relatively high voltage level 43 (see FIG. 5 of the drawings) for the purpose of generating an output signal each time demodulator 26 detects a signal at a voltage level illustrated by 43. This output is then fed into a counter which generates an absolute count of the number of signals which are generated having an amplitude as illustrated by peak amplitude 38 or 41. It is apparent, then, that the demodulator 26 has an output which corresponds to both forward and rearward movement of the target or can 29 and does not discriminate between the signals with respect to direction. This then illustrates one function of the invention.

Reference to FIG. 3 of the drawings will illustrate additional functions of the invention. Since the demodulator 26 generates an output which is characteristic of the slopes 39 and 42 of signal A and B as illustrated in FIG. 5 of the drawings, these signals may be fed into an amplifier 46 and then into an envelope/slope detector 47. This envelope/slope detector 47 is designed to detect the direction or slope of the envelopes 39 and 42. For instance, envelope 39, which is designated as the forward movement of the target or can 29, can be considered a positive direction and therefore, that signal direction can be designated as the positive signal. Envelope 42 can be designated as the rearward movement of the can and can be designated as the negative signal. Consequently, envelope/slope detector 47 will have an output which is both positive and negative and which can be fed into an up-down counter 50. The up-down counter 50 then indicates the number of targets moving in the positive or forward direction and the number of targets moving in the rearward or negative direction. This, then, becomes a direction display system which can be utilized to determine the absolute number of cans 29 moving past the particular point. One only need to subtract the number of down signals (backward movement of cans) from the total count which is illustrated by counter 45 in order to obtain an absolute number of targets moving past point 11.

A further bit of information can be derived from the signal from amplifier 46. The rate of movement of the target 29 past the transducer 11 can be determined by the period between occurrence of the peak voltage of the signal illustrated in FIG. 5. For instance, (referring again to FIG. 5 of the drawings), the time period 49 is a length of time between successive targets. Since the frequency of the acoustical signal is known, and therefore, the wave signal is known, the time between the occurrence of peak signals 41 is known and therefore, constitutes a time measure of movement of the target past the transducer 11. A signal from envelope/slope detector 47 can be fed into a rate detector 51, see FIG. 3 of the drawings, which detects this time period. This signal is then fed from the rate detector 51 into a frequency of impedance circuit which, together with the rate detector, indicates the rate of movement of the target 29 past transducer 11.

Thus, it is apparent that FIG. 3 of the drawings illustrates several applications of the invention. It illustrates the total counting aspect of the invention, the forward-backward movement detection characteristics and capabilities of the invention and it illustrates the rate detection capabilities of the invention. All of these capabilities may operate at the same time or separately. For instance, the system may be simply operated as a frequency of occurrence detector with no regard to total accumulation of the number of targets moving past the transducer 11.

It is apparent from the foregoing description that it is immaterial what frequency is utilized. Since the standing wave is the same frequency as the transmitted wave, since they both are generated by the same transducer 11, it is immaterial that the transducer frequency output might drift slightly. The standing wave simply drifts in the same direction, frequency-wise, and accordingly, there is no need for tuning oscillators in order to coordinate a separate transmitter and detector.

The transducer 11 may be practically any piezo-electrical device available on the original equipment manufacturer market. For example, there is available a variety of transducers ranging from barium titanate bonded to aluminum to an exposed ceramic element. The exposed active element type offers the best sensitivity as the active element interfaces directly with air. The bonded type devices are less sensitive because of the element, aluminum, air interface, but are usable devices, particularly in applications where hermetically sealed or non-exposed sensors are desired.

To some extent, the type of transducer selected will depend upon the application and the frequency generation desired. For instance, where simple applications such as detection of objects, such as cans moving past the transducer, is desired, then a piezo-electric device (transducer 11), generating a relatively long wave length, will be desired. On the other hand, if the desire is to use the system as a micrometer, then, of course, a relative high frequency will be desired to produce measurements which are as accurate as possible.

The sensor can be used for a number of applications. For instance, it can be used as a sensor counting device, as a low cost intrusion alarm, as a range and rate sensing system, as an edge finder, as a gear tooth counter, as a position indicator, as a pressure transducer, and so forth.

It is noted also that since the system operates on an acoustical wave principle the device cannot only be used to detect the presence of a target, but it can also be used to detect the absence of a target. For instance, it may be used to detect a "hole" in a body. It might be used to detect holes in punch cards or absence of gun powder in a cartridge.

The sensor has a wide range of applications in terms of speed of response. The practical device of this type could be utilized to produce a count rate of .001 cycles per second to ¼ the operating frequency of the piezo-electric device. For example, a 40 Kh-z device will "see" an object parked in front of it for about 100 seconds and also have the capability of counting 10,000 objects per second. The upper and lower frequency response capabilities will be limited by the electronics and not by the sensor.

Figure 2:
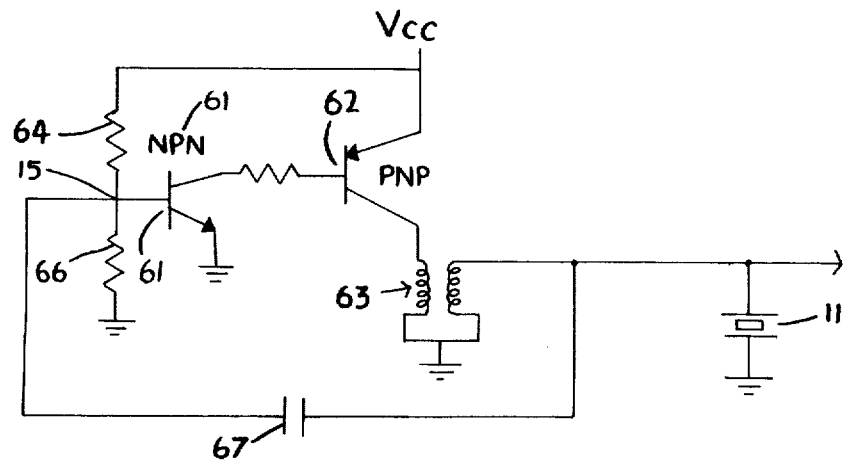
FIG. 2 illustrates an alternate configuration of the circuitry illustrated in FIG. 1 of the drawings utilizing a transformer.

While it is anticipated that present devices will probably be produced using printed circuitry, integrated circuitry and similar compact electrical systems, the invention can also be constructed from conventional transistor and tube circuitry. FIG. 2 of the drawings illustrates such an application of the invention. In this particular configuration, an NPN transistor 61, a PNP transistor 62 and a transformer 63 replaces the amplifier-oscillator 13 of the configuration set forth in FIG. 4. In this configuration, resistor 66 is approximately 10 times the size of resistor 64 in order to produce a starting current for transistor 61. Capacitor 67 provides the same function as the capacitor 18 in the circuitry of FIG. 4 of the drawings. Transistors 61 and 62 cooperate to produce the signal frequency peculiar to the transducer 11. Transformer 63 is used in order to generate greater power than might be expected from much of the typical circuitry utilized in today's electronics. In other respects, however, the circuitry set forth in FIG. 2 of the drawings works exactly the same and produces the same results.

While specific embodiments of this invention have been described herein, such alterations and modifications as will suggest themselves to those skilled in the art are also included within the spirit and scope of this invention.

What is claimed is:

1. An ultrasonic standing-wave sensor which comprises
  a. an amplifier-oscillator,
  b. a power source connected to said ammplifier-oscillator,
  c. first and second resistive impedance devices connected in series between said power source and ground,
  d. said first and second devices connected to said amplifier-oscillator to bias said amplifier-oscillator at the electrical midpoint between the said power source and ground,
  e. an electrically driven ultrasonic transducer, and
  f. capacitive impedance means interconnecting said first and second devices at said electrical midpoint and said transducer to establish a phase lag of greater than 90° between said transducer and the amplifier-oscillator input.

2. An ultrasonic standing-wave sensor which comprises
  a. an amplifier-oscillator,
  b. a power source connected to said amplifier-oscillator,
  c. first and second resistive impedance devices connected in series between said power source and ground,
  d. said first and second devices connected to said amplifier-oscillator to bias said amplifier-oscillator at the electrical midpoint between the said power source and ground,
  e. an electrically driven ultrasonic transducer,
  f. a resistive impedance means interconnecting said amplifier-oscillator and said transducer and having an impedance substantially equal to the impedance of said transducer,
  g. capacitive impedance means interconnecting said amplifier-oscillator and ground to establish the gain of said amplifier-oscillator and to provide A.C. return to ground,
  h. capacitive impedance means interconnecting said first and second devices at said electrical midpoint and said transducer to establish a phase lag of greater than 90° between said transducer and the amplifier-oscillator input, and
  i. a resistor interconnecting said amplifier-oscillator output and said capacitive impedance means to establish saturation level for the system.

3. An ultrasonic standing-wave sensor in accordance with claim 2 in which said power source is a D.C. voltage source, said first and second devices are resistors of equal resistance and said transducer is a piezo-electric device.

* * * * *